United States Patent
Yamada et al.

(10) Patent No.: US 11,172,332 B2
(45) Date of Patent: Nov. 9, 2021

(54) MOBILE INFORMATION TERMINAL, INFORMATION ACQUISITION DEVICE, INFORMATION ACQUISITION METHOD, AND INFORMATION PROVIDING SYSTEM

(71) Applicant: Mitsubishi Electric Corporation, Tokyo (JP)

(72) Inventors: Kazuhiko Yamada, Tokyo (JP); Saki Nakatsuma, Tokyo (JP); Junji Sukeno, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 315 days.

(21) Appl. No.: 16/466,095

(22) PCT Filed: Oct. 16, 2017

(86) PCT No.: PCT/JP2017/037347
§ 371 (c)(1),
(2) Date: Jun. 3, 2019

(87) PCT Pub. No.: WO2018/142680
PCT Pub. Date: Aug. 9, 2018

(65) Prior Publication Data
US 2020/0068352 A1 Feb. 27, 2020

(30) Foreign Application Priority Data

Feb. 2, 2017 (JP) .............................. JP2017-017403

(51) Int. Cl.
*H04W 4/029* (2018.01)
*G06Q 30/02* (2012.01)
(Continued)

(52) U.S. Cl.
CPC ........ *H04W 4/029* (2018.02); *G06Q 30/0201* (2013.01); *H04W 8/18* (2013.01); *H04W 48/16* (2013.01); *H04W 88/06* (2013.01)

(58) Field of Classification Search
CPC ....... H04W 4/029; H04W 8/18; H04W 48/16; H04W 88/06; H04W 60/00; H04W 52/02;
(Continued)

(56) References Cited

U.S. PATENT DOCUMENTS

2012/0136865 A1* 5/2012 Blom ...................... G06F 16/29
707/739
2012/0252516 A1* 10/2012 Miyabayashi ........ H04W 4/029
455/515
(Continued)

FOREIGN PATENT DOCUMENTS

JP  2003-97967 A  4/2003
JP  2003-99661 A  4/2003
(Continued)

OTHER PUBLICATIONS

International Search Report and Written Opinion dated Nov. 28, 2017 for PCT/JP2017/037347 filed on Oct. 16, 2017, 12 pages including English Translation of the International Search Report.

*Primary Examiner* — Ian N Moore
*Assistant Examiner* — Latresa A McCallum
(74) *Attorney, Agent, or Firm* — Xsensus LLP

(57) ABSTRACT

A mobile information terminal of an information providing system includes a beacon reception unit that receives a beacon transmitted from a beacon transmitter, a wireless communication unit that communicates with a content server-via a network, a storage unit that stores a database, an activity judgment unit-that generates information based on activity of a user from information based on the beacon received by the beacon reception unit and stores a first information table including information based on the beacon
(Continued)

and information based on the activity in the database, a URL generation unit that generates a URL indicating an access destination in the content server from the first information table, and a control unit that acquires content from the access destination indicated by the URL via the wireless communication unit.

15 Claims, 14 Drawing Sheets

(51) Int. Cl.
H04W 8/18 (2009.01)
H04W 48/16 (2009.01)
H04W 88/06 (2009.01)

(58) Field of Classification Search
CPC .. H04W 74/02; H04W 76/28; G06Q 30/0201; G06Q 10/0631; G06Q 10/06315; G06Q 30/0211; G06Q 30/0242; G06Q 30/0623; G06Q 40/00; G06F 16/00; H04M 1/2745; H04L 29/08918; H04B 1/7075; H04B 1/406

See application file for complete search history.

(56) References Cited

U.S. PATENT DOCUMENTS

2014/0365308 A1   12/2014   Tsuchiya
2016/0086142 A1*  3/2016   Ando ................ G06Q 30/0639
                                              705/26.9

FOREIGN PATENT DOCUMENTS

| JP | 2007-72959 A | 3/2007 |
| JP | 2014-241509 A | 12/2014 |
| JP | 2016-14997 A | 1/2016 |
| JP | 2016-51355 A | 4/2016 |

* cited by examiner

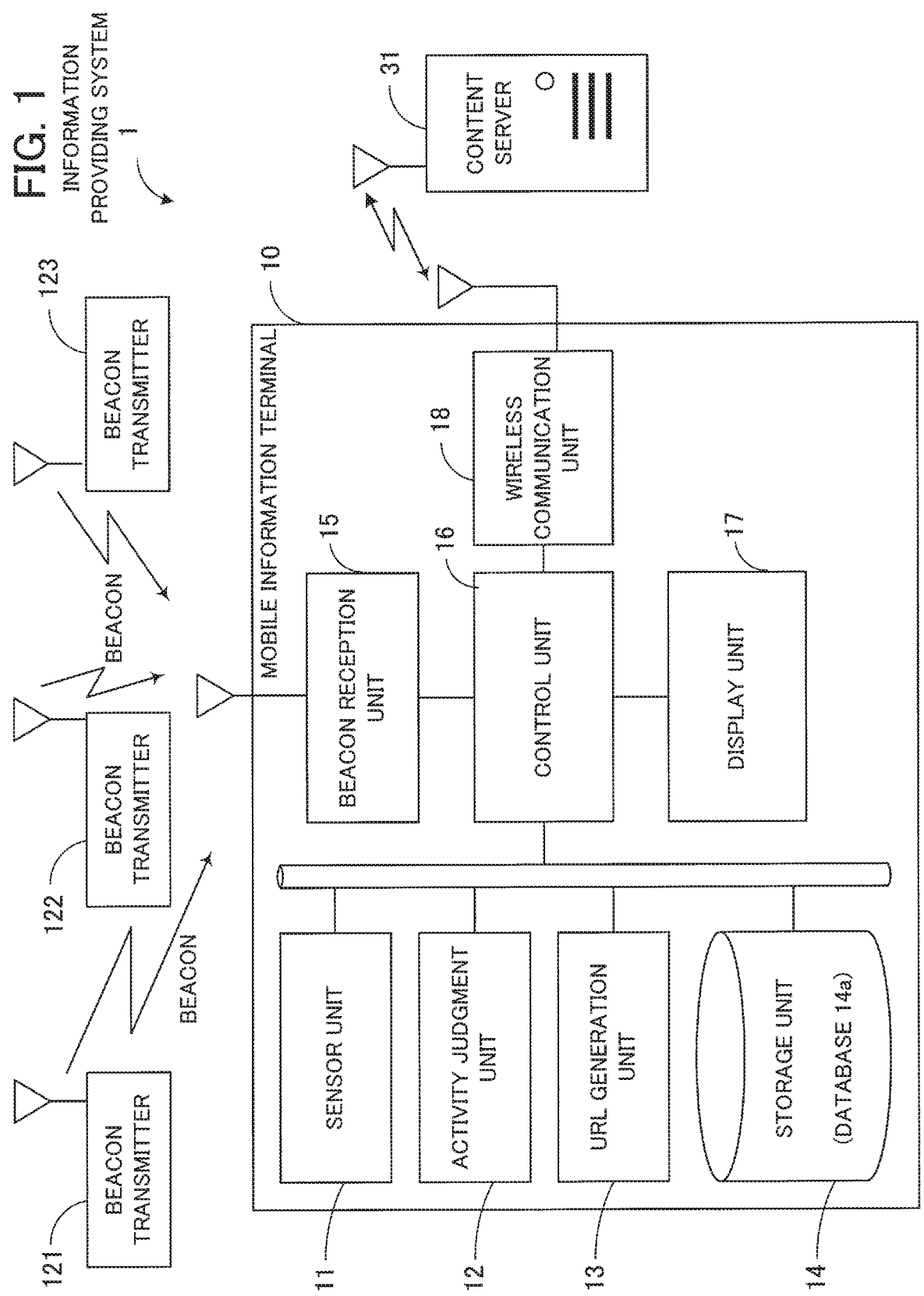

| EXTENDED INFORMATION | CLASSIFICATION | MEANING | DESIGNATION METHOD |
|---|---|---|---|
| L | ATTRIBUTE | LANGUAGE | JP, US, FR, ES, ... |
| G | ATTRIBUTE | GENDER | MA, FE |
| T | ATTRIBUTE | TIME | 104026, 131620, ... |
| R | ACTIVITY | MOVING ROUTE | IMMEDIATELY PREVIOUS FACILITY INFORMATION (FACILITY ID) |
| M | ACTIVITY | MAP | MAP |
| C | ACTIVITY | COUPON | CPN |

FIG. 3

| TIME | FACILITY INFORMATION | | | BASIC URL | EXTENDED INFORMATION | RECEPTION RADIO FIELD INTENSITY (dBm) | | ACTIVITY INFORMATION | INTEREST LEVEL | |
|---|---|---|---|---|---|---|---|---|---|---|
| | FACILITY ID | CLASSIFICATION 1 | CLASSIFICATION 2 | | | PRESENT | MAXIMUM | | | |
| ... | ... | ... | ... | ... | ... | ... | ... | ... | ... | |
| 13:16:20 | 0056 | DINING SHOP | CHINESE FOOD | URL0056 | LGTC | 0 | −67 | LOW SPEED PASSAGE | 0 | ACT001 |
| 13:16:27 | 0057 | DINING SHOP | CURRY | URL0057 | LGTC | 0 | −47 | ENTRY | 2 | ACT002 |
| 13:52:10 | 0008 | FACILITY | UPWARD/ DOWNWARD ESCALATOR | URL0008 | LR | 0 | −45 | USE | 0 | ACT003 |
| 13:52:15 | 0122 | RETAIL SHOP | BREAD | URL0122 | LT | 0 | −80 | HIGH SPEED PASSAGE | 0 | ACT004 |
| ... | ... | ... | ... | ... | ... | ... | ... | ... | ... | |

INFORMATION BASED ON RECEIVED BEACON

INFORMATION GENERATED BY ACTIVITY JUDGMENT UNIT (INFORMATION BASED ON ACTIVITY)

IT01 FIRST INFORMATION TABLE

TIME →

FIG. 5

SECOND INFORMATION TABLE — AT01

| | | T1 | T2 | T3 | T4 | T5 | T6 | T7 | T8 |
|---|---|---|---|---|---|---|---|---|---|
| SENSOR INFORMATION | SENSOR UNIT 11 (MOVING SPEED) | NORMAL | NORMAL | LOW SPEED | LOW SPEED | LOW SPEED | LOW SPEED | LOW SPEED | LOW SPEED |
| | SENSOR UNIT 11 (MOVING DIRECTION) | NORTH | NORTH | NORTH | NORTH | NORTH | NORTH | NORTH | EAST |
| FACILITY INFORMATION AND RECEPTION RADIO FIELD INTENSITY (dBm) | FACILITY ID 0055 | −68 | −77 | −84 | −93 | — | — | — | — |
| | FACILITY ID 0056 | — | −94 | −85 | −76 | −67 | −78 | −87 | −93 |
| | FACILITY ID 0057 | — | — | — | −92 | −86 | −77 | −67 | −58 |

SECOND INFORMATION TABLE — AT02

| | | T5 | T6 | T7 | T8 | T9 | T10 | T11 | T12 |
|---|---|---|---|---|---|---|---|---|---|
| SENSOR INFORMATION | SENSOR UNIT 11 (MOVING SPEED) | LOW SPEED | LOW SPEED | LOW SPEED | LOW SPEED | STOP | LOW SPEED | STOP | STOP |
| | SENSOR UNIT 11 (MOVING DIRECTION) | NORTH | NORTH | NORTH | EAST | EAST | NORTH | WEST | WEST |
| FACILITY INFORMATION AND RECEPTION RADIO FIELD INTENSITY (dBm) | FACILITY ID 0056 | −67 | −78 | −87 | −93 | — | — | — | — |
| | FACILITY ID 0057 | −86 | −77 | −67 | −58 | −47 | −53 | −64 | −65 |

FIG. 7

| TIME | FACILITY INFORMATION ||| BASIC URL | EXTENDED INFORMATION | RECEPTION RADIO FIELD INTENSITY (dBm) || ACTIVITY INFORMATION | INTEREST LEVEL |
| --- | --- | --- | --- | --- | --- | --- | --- | --- | --- |
| | FACILITY ID | CLASSIFICATION 1 | CLASSIFICATION 2 | | | PRESENT | MAXIMUM | | |
| ⋮ | ⋮ | ⋮ | ⋮ | ⋮ | ⋮ | ⋮ | ⋮ | ⋮ | ⋮ |
| 20:25:24 | 0024 | RETAIL SHOP | PHARMACY | URL0024 | LGC | 0 | −69 | HIGH SPEED PASSAGE | 0 |
| 20:25:30 | 0026 | RETAIL SHOP | SHOE SHOP | URL0026 | LGCM | −84 | −67 | HIGH SPEED PASSAGE | 0 |
| 20:25:34 | −1 | — | — | — | — | — | — | COURSE PONDERING | 0 |

"−1": NOT "ACTIVITY PERFORMED ON FACILITY"

INFORMATION BASED ON RECEIVED BEACON — INFORMATION GENERATED BY ACTIVITY JUDGMENT UNIT (INFORMATION BASED ON ACTIVITY)

IT02 FIRST INFORMATION TABLE

TIME →

FIG. 8

| SECOND INFORMATION TABLE | | T121 | T122 | T123 | T124 | T125 | T126 | T127 | T128 |
|---|---|---|---|---|---|---|---|---|---|
| SENSOR INFORMATION | SENSOR UNIT 11 (MOVING SPEED) | HIGH SPEED | HIGH SPEED | HIGH SPEED | HIGH SPEED | HIGH SPEED | HIGH SPEED | STOP | STOP |
| | SENSOR UNIT 11 (MOVING DIRECTION) | SOUTH | SOUTH | SOUTH | SOUTH | SOUTH | SOUTH | SOUTH EAST | MULTIPLE |
| FACILITY INFORMATION AND RECEPTION RADIO FIELD INTENSITY (dBm) | FACILITY ID 0024 | −88 | −78 | −69 | −79 | −89 | — | — | — |
| | FACILITY ID 0026 | — | — | — | −90 | −78 | −67 | −76 | −84 |

AT03 spans columns T121–T128. Time axis →

FIG. 10(a) GENERATED URL (BASIC)
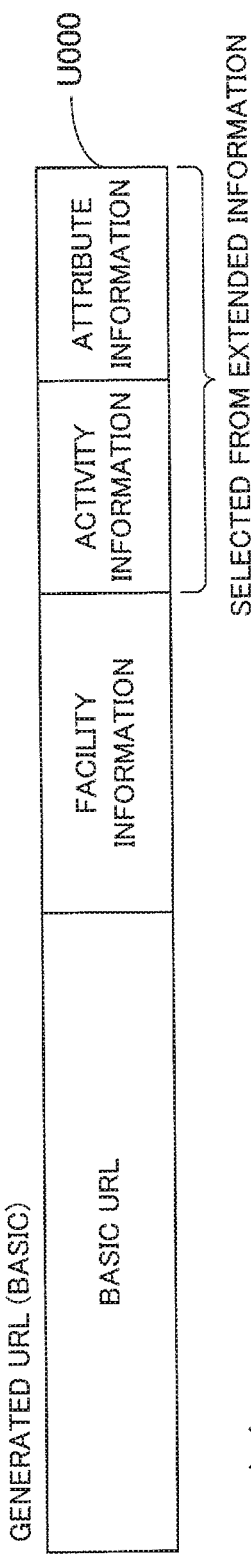
FIG. 10(b) GENERATED URL (SHOP) → RELEVANT SHOP, AFFILIATION COUPON
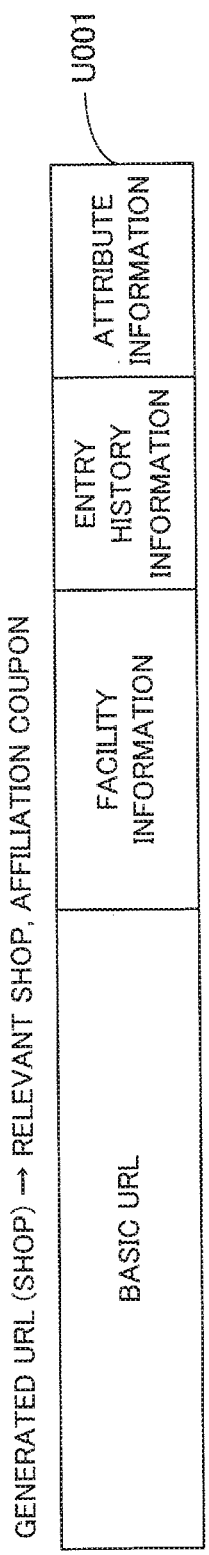
FIG. 10(c) GENERATED URL (FACILITY) → INFORMATION REGARDING MOVING DIRECTION
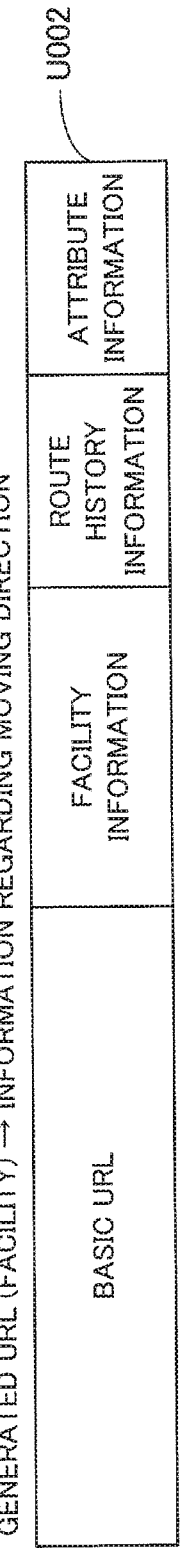
FIG. 10(d) GENERATED URL (FACILITY) → VICINAL AREA MAP
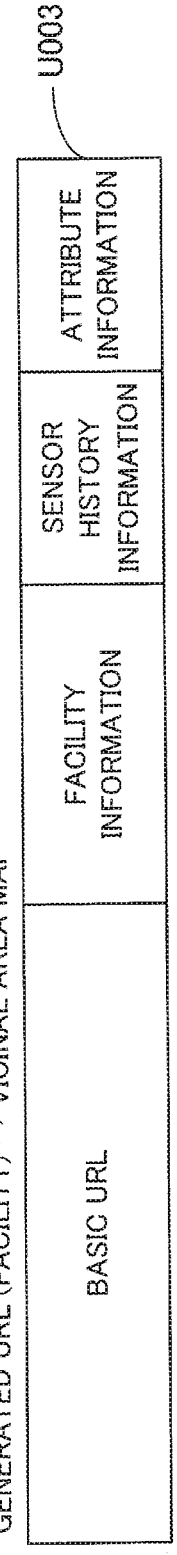

FIG. 13

| TIME | FACILITY INFORMATION | BASIC URL | FACILITY INFORMATION | RECEPTION RADIO FIELD INTENSITY (dBm) | ACTIVITY INFORMATION | |
|---|---|---|---|---|---|---|
| : | : | : | : | : | : | |
| 15:23:31 | T057 | A-Train.Express.station20.stateA | 4 | -91 | GET OFF | ACT101 |
| 15:26:35 | T057 | A-Train.Local.station21.stateB | 9 | -62 | ON BOARD | ACT102 |

INFORMATION BASED ON RECEIVED BEACON

INFORMATION GENERATED BY ACTIVITY JUDGMENT UNIT (INFORMATION BASED ON ACTIVITY)

IT11 FIRST INFORMATION TABLE

TIME →

MOBILE INFORMATION TERMINAL, INFORMATION ACQUISITION DEVICE, INFORMATION ACQUISITION METHOD, AND INFORMATION PROVIDING SYSTEM

CROSS-REFERENCE TO RELATED APPLICATIONS

The present application is based on PCT filing PCT/JP2017/037347, filed Oct. 16, 2017 which claims priority to JP 2017-017403 filed Feb. 2, 2017, both of which are incorporated herein by reference.

TECHNICAL FIELD

The present invention relates to a mobile information terminal and an information acquisition method for generating access destination information from information based on a received signal and information based on activity of a user and acquiring content of an access destination indicated by the access destination information from a content server, and to an information providing system including the mobile information terminal and the content server.

BACKGROUND ART

In recent years, information providing services have spread for providing a mobile information terminal carried by a user such as a smartphone with shop information on a commercial facility where the user is visiting, a coupon usable in a shop, or the like. For example, Patent Reference 1 describes a position information service system that provides a mobile information terminal carried by a user with information by using an electronic tag transmission device placed at an intended position in a commercial facility without depending on the GPS or a network environment.

Patent Reference 2 describes a service information providing system capable of providing service information personalized according to previously set terminal-side information by filtering out (removing) service information unnecessary to a user by use of the terminal-side information and access point-side information.

PRIOR ART REFERENCE

Patent Reference

Patent Reference 1: Japanese Patent Application Publication No. 2016-51355 (paragraph 0007, FIG. 1)
Patent Reference 2: Japanese Patent Application Publication No. 2003-97967 (paragraph 0007, FIG. 1)

SUMMARY OF THE INVENTION

Problem to be Solved by the Invention

However, in the system described in the Patent Reference 1, the mobile information terminal carried by the user receives an application from a server based on an ID (identifier) of a received electronic tag, executes the received application, and thus acquires content corresponding to a condition or attribute specific to the user from the server, and therefore it is difficult for the system to acquire desired content in a short time. Thus, when the user is moving, there are cases where the content acquired by the mobile information terminal is useless information regarding a shop the user already passed by.

Further, in the system described in the Patent Reference 2, although a mobile information terminal carried by the user is capable of acquiring service information personalized according to previously set terminal-side information via a network, it is difficult to provide content suitable for activity of the user. Thus, there are cases where the content acquired by the mobile information terminal is information useless to the user.

It is therefore an object of the present invention, which has been made to resolve the above-described problems with the conventional technology, to provide a mobile information terminal and an information acquisition method with which content useful to the user can be acquired quickly and an information providing system including the mobile information terminal and a content server.

Means for Solving the Problem

A mobile information terminal according to an aspect of the present invention is a mobile information terminal used by a user, including: a reception unit to receive a signal transmitted from a transmitter installed in a facility; a wireless communication unit to communicate with a content server via a network; a storage unit to store a database; an activity judgment unit to generate information based on activity of the user from information based on the signal received by the reception unit and to store a first information table including information based on the signal and information based on the activity in the database; an access destination information generation unit to generate access destination information indicating an access destination in the content server from the first information table; and a control unit to acquire content from the access destination indicated by the access destination information via the wireless communication unit.

An information acquisition method according to another aspect of the present invention is an information acquisition method in a mobile information terminal used by a user and storing a database, including: receiving a signal transmitted from a transmitter installed in a facility; generating information based on activity of the user from information based on the received signal and storing a first information table including information based on the signal and information based on the activity in the database; generating access destination information indicating an access destination in a content server from the first information table; and acquiring content from the access destination indicated by the access destination information.

Effect of the Invention

According to the present invention, the access destination information is generated from the information based on the signal and the information based on the activity of the user, and the content of the access destination indicated by the access destination information is acquired from the content server, and thus an effect is achieved in that the user's mobile information terminal can quickly acquire content useful to the user.

BRIEF DESCRIPTION OF THE DRAWINGS

FIG. 1 is a functional block diagram schematically showing a configuration of an information providing system according to a first embodiment of the present invention.

FIG. 3 is a diagram showing an example of a first information table stored in a database in a mobile information terminal of the information providing system according to the first embodiment.

FIG. 5 is a diagram showing an example of a second information table stored in the database in the mobile information terminal of the information providing system according to the first embodiment.

FIG. 7 is a diagram showing an example of the first information table (in a case where a sensor event is added) stored in the database in the mobile information terminal of the information providing system according to the first embodiment.

FIG. 8 is a diagram showing an example of the second information table (in a case where a sensor event is added) stored in the database in the mobile information terminal of the information providing system according to the first embodiment.

FIGS. 10(a) to 10(d) are diagrams showing configuration examples of a URL generated by the URL generation unit in the mobile information terminal of the information providing system according to the first embodiment.

FIG. 13 is a diagram showing an example of a first information table stored in a database in a mobile information terminal of the information providing system according to the second embodiment.

MODE FOR CARRYING OUT THE INVENTION

Figures 2A, 2B:
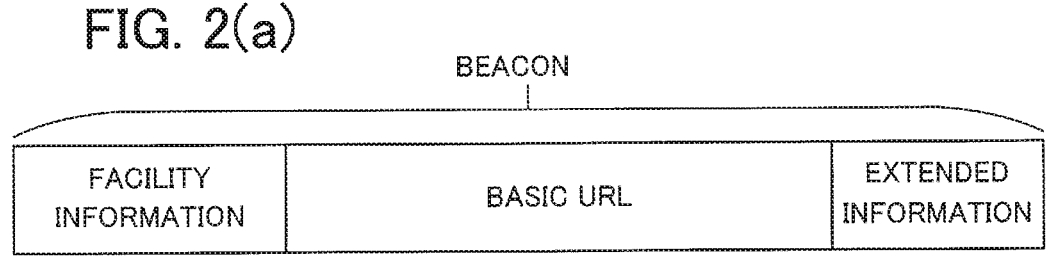
FIG. 2(a) is a diagram showing a configuration example of information included in a beacon transmitted from a beacon transmitter in the information providing system according to the first embodiment.
FIG. 2(b) is a diagram showing an example of extended information included in the beacon.

A mobile information terminal, an information acquisition method and an information providing system including the mobile information terminal and a content server according to embodiments of the present invention will be described below with reference to the accompanying drawings. The mobile information terminal according to each embodiment generates a URL (Uniform Resource Locator) as access destination information indicating an access destination in a content server from a first information table including information based on a beacon as a signal transmitted from a transmitter installed in a facility and information based on activity (including movement) of a user and acquires content of the access destination indicated by the URL from the content server. Incidentally, the first information table may include information indicating an attribute of the user of the mobile information terminal. Further, the embodiments described below are just examples and a variety of modifications are possible within the scope of the present invention.

(1) First Embodiment (1-1) Configuration

FIG. 1 is a functional block diagram schematically showing a configuration of an information providing system 1 according to a first embodiment of the present invention. The information providing system 1 is applicable to various types of facilities such as shopping streets, department stores and transportation facilities. As shown in FIG. 1, the information providing system 1 includes a mobile information terminal 10 used by a user such as a smartphone, a tablet terminal or a mobile phone, a content server 31 communicating with the mobile information terminal 10 via a network, and beacon transmitters 121, 122, 123 as one or more transmitters each installed in a facility (e.g., shop) and transmitting a beacon. The mobile information terminal 10 is a device capable of executing an information acquisition method according to the first embodiment. This description will be given of a case where the beacon is transmitted by means of a wireless transmission method according to Bluetooth Low Energy (BLE) (registered trademark). Transmitters installed in facilities are the beacon transmitters 121, 122, 123, signals transmitted from the beacon transmitters are beacons, and a reception unit receiving the beacons is a beacon reception unit 15.

The mobile information terminal 10 includes a sensor unit 11 for detecting movement of the user and outputting detection information (sensor information) based on the detected movement, an activity judgment unit 12 for judging activity (including movement) of the user, a URL generation unit 13 as an access destination information generation unit that generates a URL as access destination information, and a storage unit 14 such as a semiconductor memory for storing a database 14a. Further, the mobile information terminal 10 includes the beacon reception unit 15 as a reception unit for receiving the beacons transmitted from the beacon transmitters 121, 122, 123 repeatedly at time intervals (generally, periodically at predetermined time intervals) by means of short-range wireless communication, a control unit 16 for controlling the operation of the mobile information terminal 10, and a wireless communication unit 18 for wirelessly communicating with the content server 31 via the network.

Furthermore, the mobile information terminal 10 may include a display unit 17 for displaying images and an audio output unit for outputting sound. The display unit 17 may be a touch panel formed by overlapping an operation panel for receiving user operations and a display panel for displaying images with each other. The mobile information terminal 10 has a function of generating access destination information on an access destination in the content server 31 from information based on the beacon received by the beacon reception unit 15 and information based on the activity of the user obtained as a result of the judgment by the activity judgment unit 12, acquiring content of the access destination indicated by the access destination information from the content server 31, and displaying the content on the display unit 17.

The content server 31 is desired to manage and store a plurality of items of content in regard to respective facilities (e.g., shops) by using URLs different from each other. For example, the content server 31 manages a plurality of items of content regarding a plurality of facilities by using URLs different from each other. Incidentally, the items of content stored in the content server 31 can include one or more items of content in regard to each facility (e.g., each shop). Further, the number of content servers 31 is not limited to one but can be two or more.

One beacon transmitter 121, 122, 123 is installed in each facility (e.g., each shop), for example. The installation position of the beacon transmitter 121, 122, 123 and transmission radio field intensity of the beacon transmitted from the beacon transmitter 121, 122, 123 are set so that the beacon is received by the mobile information terminal 10 carried by the user entering the shop or passing nearby the shop. The number of beacon transmitters 121, 122, 123 is not limited to three but can also be less than three or four or more.

FIG. 2(*a*) is a diagram showing a configuration example of information included in the beacon transmitted from the beacon transmitter 121, 122, 123 in the information providing system 1 according to the first embodiment. FIG. 2(*b*) is a diagram showing an example of extended information included in the beacon.

As shown in FIG. 2(*a*), the beacon transmitted from the beacon transmitter 121, 122, 123 includes facility information, a basic URL as basic information, and the extended information.

The facility information included in the beacon is formed of information corresponding to the shop as the facility in which the beacon transmitter 121, 122, 123 is installed, such as a numerical value corresponding to the facility (e.g., shop) in which the beacon transmitter 121, 122, 123 is installed.

The basic URL included in the beacon is formed of URL information for specifying content in the content server 31 in regard to service provided in or in the vicinity of the shop as the facility in which the beacon transmitter 121, 122, 123 is installed.

The extended information included in the beacon is formed of information corresponding to the content in the content server 31 in regard to the service provided in or in the vicinity of the shop as the facility in which the beacon transmitter 121, 122, 123 is installed.

As shown in FIG. 2(*b*), the extended information can include one or more of an identifier "L" of language information specifying the language of the content, an identifier "G" of gender information specifying a gender highly relevant to the content, an identifier "T" of time information specifying a time regarding the content, an identifier "R" of moving route information for specifying a moving route to a target facility in regard to the content, an identifier "M" of map information for specifying a map of a vicinal area of the target facility in regard to the content, and an identifier "C" of coupon information for specifying a coupon usable in the target facility in regard to the content, for example.

As shown in FIG. 2(*b*), the extended information is classified into two types: "attribute" and "activity. The "attribute" means information regarding an attribute of the facility user, and the "activity" means information regarding activity (movement) of the facility user. As the extended information included in the beacon, one or more items of information can be selected from "L", "G", "T", "R", "M" and "C" shown in FIG. 2(*b*), for example.

When the identifier "L" is included in the extended information in the received beacon, content supporting a plurality of languages is stored in the content server 31. In this case, when generating the URL, the mobile information terminal 10 specifies language information such as "JP" (Japanese), "US" (English), "FR" (French) or "ES" (Spanish) in the URL, for example.

When the identifier "G" is included in the extended information in the received beacon, content relevant to a gender is stored in the content server 31. In this case, when generating the URL, the mobile information terminal 10 specifies gender information such as "MA" (male) or "FE" (female) in the URL, for example.

When the identifier "T" is included in the extended information in the received beacon, content corresponding to a time is stored in the content server 31. In this case, when generating the URL, the mobile information terminal 10 specifies time information such as "104026" (i.e., 10 o'clock 40 minutes 26 seconds) or "131620" (i.e., 13 o'clock 16 minutes 20 seconds) in the URL, for example.

When the identifier "R" is stored in the extended information in the received beacon, content corresponding to a moving route is stored in the content server 31. In this case, when generating the URL, the mobile information terminal 10 specifies facility information (including a facility ID) regarding a shop as an in-facility area that the user passed nearby most recently in the URL, for example.

When the identifier "M" is stored in the extended information in the received beacon, content corresponding to a map is stored in the content server 31. In this case, when generating the URL, the mobile information terminal 10 specifies "MAP" as map information in the URL, for example.

When the identifier "C" of coupon information is stored in the extended information in the received beacon, content including a coupon is stored in the content server 31. In this case, when generating the URL, the mobile information terminal 10 specifies "CPN" as coupon information in the URL, for example.

The sensor unit 11 of the mobile information terminal 10 is a detection unit that detects the movement of the user carrying and using the mobile information terminal 10. The sensor unit 11 includes a GPS (Global Positioning System), an acceleration sensor, a gyro sensor, a geomagnetism sensor or the like, for example. The movement of the user detected by the sensor unit 11 can include the position of the user, the moving speed of the user, the moving direction of the user or the like, for example.

The activity judgment unit 12 stores information based on the beacons received by the beacon reception unit 15 in the database 14*a* as the first information table (FIG. 3 which will be explained later) while also storing information based on the activity of the user (information generated by the activity judgment unit 12) as the first information table.

The database 14*a* can store a second information table (FIG. 5 which will be explained later) including sensor information as detection information outputted from the sensor unit 11 and information indicating reception radio field intensity of the beacon. In this case, the activity judgment unit 12 can update the first information table based on the second information table.

The URL generation unit 13 generates the URL as the access destination information on the content of the access destination based on the first information table (FIG. 3) stored in the database 14a.

FIG. 3 is a diagram showing an example of the first information table stored in the database 14a in the mobile information terminal 10 of the information providing system 1 according to the first embodiment. As shown in FIG. 3, the first information table IT01 is formed of time, facility information, basic URLs, extended information, reception radio field intensity information (dBm), activity information, and interest level information. The URL generation unit 13 selects a basic URL (basic information), facility information, an identifier based on activity included in the extended information, and an identifier based on an attribute included in the extended information from the first information table and generates a URL by combining the selected information and identifiers.

In the first information table IT01, the "time" indicates the time when the activity of the user was registered or updated. The facility information is information regarding the target facility (e.g., shop) where the user performed the activity. The facility information includes a facility ID, classification 1 and classification 2, for example. The facility ID indicates a unique ID number assigned to each facility (e.g., shop), and the classification 1 and the classification 2 indicate information regarding the facility that can be recognized from the facility ID.

In the first information table IT01, the "basic URL" is basic URL information included in the beacon transmitted from the beacon transmitter installed in the target facility where the user performed the activity. The extended information is the extended information included in the beacon transmitted from the beacon transmitter in the target facility where the user performed the activity. Further, in the first information table IT01, the "reception radio field intensity" indicates the reception radio field intensity of the beacon transmitted from the beacon transmitter installed in the facility as the target of the activity of the user. The "present" indicates the reception radio field intensity at the present time, while the "maximum" indicates the maximum value of the reception radio field intensity.

In the first information table IT01, the "activity information" indicates details (history) of activity performed by the user in relation to target facilities. The "interest level" indicates the level of the user's interest in each target facility. The "interest level" is, for example, an index represented by an integer greater than or equal to 0, in which a greater numerical value means a higher interest level.

Among the items of information indicated in the first information table IT01, the "time", the "facility information", the "basic URL", the "extended information" and the "reception radio field intensity" are information updated based on the beacons received by the beacon reception unit 15, that is, information based on the beacons. The "activity information" and the "interest level" are information updated based on the result of the judgment by the activity judgment unit 12, that is, information based on the activity of the user.

For example, FIG. 3 shows activity of searching for a shop as a facility in a food mall including a plurality of facilities, taking a meal in a curry restaurant, thereafter going up on an escalator to an upper floor, and passing in front of a bakery as a facility at a quick pace.

In FIG. 3, the activity information "ACT001" indicates that the user passed by a Chinese restaurant as a dining shop having a facility ID "0056" at low speed at the time "13:16:20" and the user's "interest level" in the Chinese restaurant is at a low value "0".

Further, it is indicated that the basic URL regarding the activity information "ACT001" is "URL0056", the extended information is "LGTC", that is, "language, gender, time, coupon", and the maximum reception radio field intensity when the user passed by is "−67 dBm".

The activity "ACT002" indicates that the user entered a curry restaurant as a dining shop having a facility ID "0057" at the time "13:16:27" and the user's "interest level" in the curry restaurant is at a high value "2".

Further, it is indicated that the basic URL regarding the activity "ACT002" is "URL0057", the extended information is "LGTC", that is, "language, gender, time, coupon", and the maximum reception radio field intensity when the user entered the restaurant is "−47 dBm".

The activity "ACT003" indicates that the user used an upward/downward escalator as a facility having a facility ID "0008" at the time "13:52:10" and the user's "interest level" in the escalator is at a low value "0".

Further, it is indicated that the basic URL regarding the activity "ACT003" is "URL0008", the extended information is "LR", that is, "language, moving route", and the maximum reception radio field intensity when the user used the escalator is "−45 dBm".

The activity "ACT004" indicates that the user passed by a bakery as a retail shop having a facility ID "0122" at high speed at the time "13:52:15" and the user's "interest level" in the bakery is at a low value "0".

Further, it is indicated that the basic URL regarding the activity "ACT004" is "URL0122", the extended information is "LT", that is, "language, time", and the maximum reception radio field intensity when the user passed by is "−80 dBm".

In the mobile information terminal 10, the beacon reception unit 15 receives the beacons transmitted from the beacon transmitters and the control unit 16 updates the first information table IT01 based on the received beacons. Here, the method for transmitting the beacons is not limited to Bluetooth Low Energy; it is also possible to employ a configuration employing a wireless communication method such as acoustic communication or visible light communication and eliminating the need of communication for pairing settings and negotiation with the beacon transmitter only by providing a beacon reception unit on the mobile information terminal 10's side.

The wireless communication unit 18 is a communication unit for accessing the URL in the content server 31 generated by the URL generation unit 13. The display unit 17 displays the content of the URL generated by the URL generation unit 13. The control unit 16 controls the operation of the blocks of the whole device.

(1-2) Operation

Figure 4:
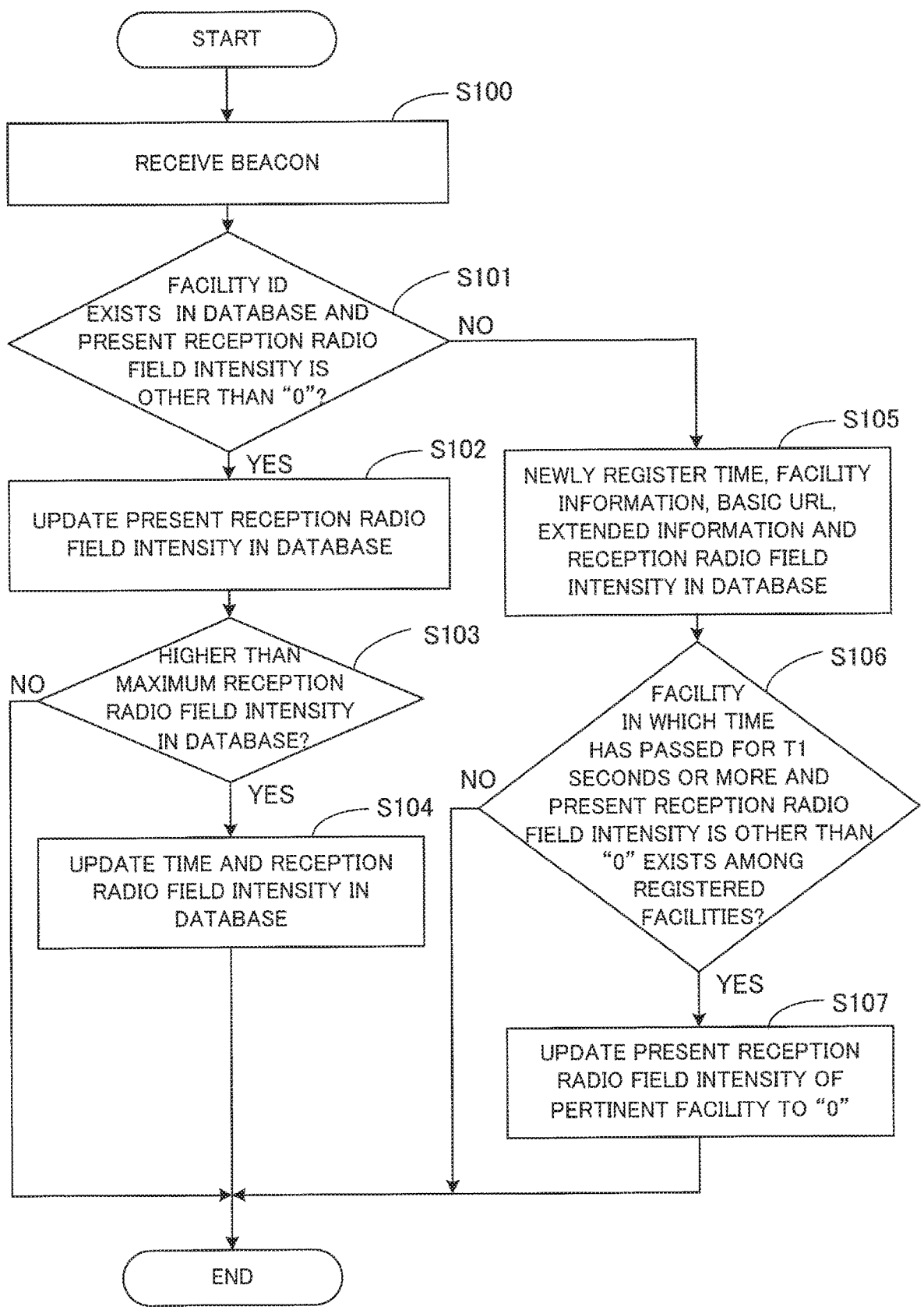
FIG. 4 is a flowchart showing an update process for the first information table stored in the database in the mobile information terminal of the information providing system according to the first embodiment.

FIG. 4 is a flowchart showing an update process of the first information table IT01 stored in the database 14a in the mobile information terminal 10 of the information providing system 1 according to the first embodiment.

In response to a command from the control unit 16, the beacon reception unit 15 receives a beacon transmitted from a beacon transmitter (step S100).

Subsequently, the control unit 16 extracts the facility information from the beacon received by the beacon reception unit 15 and judges whether or not an event regarding the facility indicated by the facility ID in the facility information exists in the first information table IT01 and the present reception radio field intensity in the event is not "0" (step S101).

When the present reception radio field intensity is not "0" (YES in the step S101), the control unit 16 advances the process to step S102 in order to execute an update process of the first information table IT01.

When the present reception radio field intensity is "0" (NO in the step S101), the control unit 16 advances the process to step S105 in order to execute a new registration process of an event regarding the facility indicated by the extracted facility ID.

When executing the update process of the first information table IT01 (YES in the step S101), the control unit 16 updates the present reception radio field intensity regarding the pertinent facility ID in the first information table IT01 (step S102).

Subsequently, the control unit 16 compares the present reception radio field intensity of the target facility with the maximum reception radio field intensity of the target facility in the first information table IT01. If the present reception radio field intensity is higher (YES in step S103), the control unit 16 executes the process of step S104 and the following steps; if it is not so (NO in the step S103), the control unit 16 ends the reception process.

When the present reception radio field intensity is higher (YES in the step S103), the control unit 16 updates the time and the maximum reception radio field intensity of the target facility in the first information table IT01 (step S104).

When new registration in the first information table IT01 is executed in the first information table IT01 (NO in the step S101), the control unit 16 newly registers the time and the facility information, the basic URL information, the extended information and the reception radio field intensity of the received beacon in the first information table IT01 (step S105).

Subsequently, the control unit 16 judges whether or not there exists a facility satisfying a condition that the time has passed for T1 seconds or more and the present reception radio field intensity is not "0" among the facilities already registered in the first information table IT01. If there exists such a facility (YES in step S106), the control unit 16 executes an invalidation process of step S107; if there is not such a facility (NO in the step S106), the control unit 16 ends the update process.

As above, the control unit 16 registers information included in the beacon received by the beacon reception unit 15 and the reception radio field intensity at that time in the first information table IT01 stored in the database 14a. Thereafter, the control unit 16 updates the reception radio field intensity and the time each time the beacon reception unit 15 receives a beacon of the same facility.

Next, a process of the activity judgment unit 12 will be described. FIG. 5 is a diagram showing an example of the second information table stored in the database 14a in the mobile information terminal 10 of the information providing system 1 according to the first embodiment.

The second information table in the first embodiment stores "sensor information" and "facility information" in regard to the most recent eight times. For example, T1 to T8 in the second information table AT01 shown in FIG. 5 represent times of acquisition. Among the times, T8 represents the most recent time and T1 represents the oldest time. The sensor information stores information on the "moving speed" and the "moving direction" as the detection information acquired from the sensor unit 11. As the facility information, the reception radio field intensity regarding each facility ID acquired from the first information table IT01 is stored. The reception radio field intensity in the first information table IT01 includes as many reception radio field intensities as the number of currently received beacons (i.e., the number of facilities).

Thus, the second information table AT01 includes the detection information on detection by the sensor unit 11 and the reception radio field intensity of the beacon transmitted from the beacon transmitter of each facility at times from the past time T1 to the present time T8. Specifically, it is indicated that the "moving speed" as the detection information acquired from the sensor unit 11 is "normal" in a period from the time T1 to the time T2 and is "low speed" in a period from the time T3 to the time T8. It is indicated that the "moving direction" as the detection information acquired from the sensor unit 11 is "north" from the time T1 to the time T7 and is "east" at the time T8.

Further, it is indicated that the beacon transmitted from the beacon transmitter of the facility having the facility ID "0055" is received in a period from the time T1 to the time T4 and the reception radio field intensity is the highest at the time T1 and thereafter gradually decreases.

It is indicated that the beacon transmitted from the beacon transmitter of the facility having the facility ID "0056" is received in a period from the time T2 to the time T8, the first reception is at the time T2, and the reception radio field intensity gradually increases until the time T5 and thereafter gradually decreases until the time T8.

It is indicated that the beacon transmitted from the beacon transmitter of the facility having the facility ID "0057" is received from the time T4 to the time T8 and the reception radio field intensity gradually increases until the time T8.

A second information table AT02 is a table at a time point that is a certain time (i.e., the time from the time T1 to the time T5) after that of the second information table AT01 and indicates the detection information on detection by the sensor unit 11 and the reception radio field intensity of the beacon transmitted from each facility at times from the time T5 to the present time T12. Specifically, it is indicated that the "moving speed" as the detection information acquired from the sensor unit 11 is "low speed" from the time T5 to the time T8, "stop" at the time T9, "low speed" at the time T10, and "stop" from the time T11 to the time T12. Further, it is indicated that the "moving direction" as the detection information acquired from the sensor unit 11 is "north" from the time T5 to the time T7, "east" from the time T8 to the time T9, "north" at the time T10, and "west" from the time T11 to the time T12.

Furthermore, it is indicated that the beacon transmitted from the beacon transmitter of the facility having the facility ID "0056" is received in the period from the time T5 to the time T8 and the reception radio field intensity is the highest at the time T5 and thereafter gradually decreases.

It is indicated that the beacon transmitted from the beacon transmitter of the facility having the facility ID "0057" is received from the time T5 to the time T12 and the reception radio field intensity gradually increases from the time T5 to the time T9 and thereafter gradually decreases until the time T12.

Figure 6:
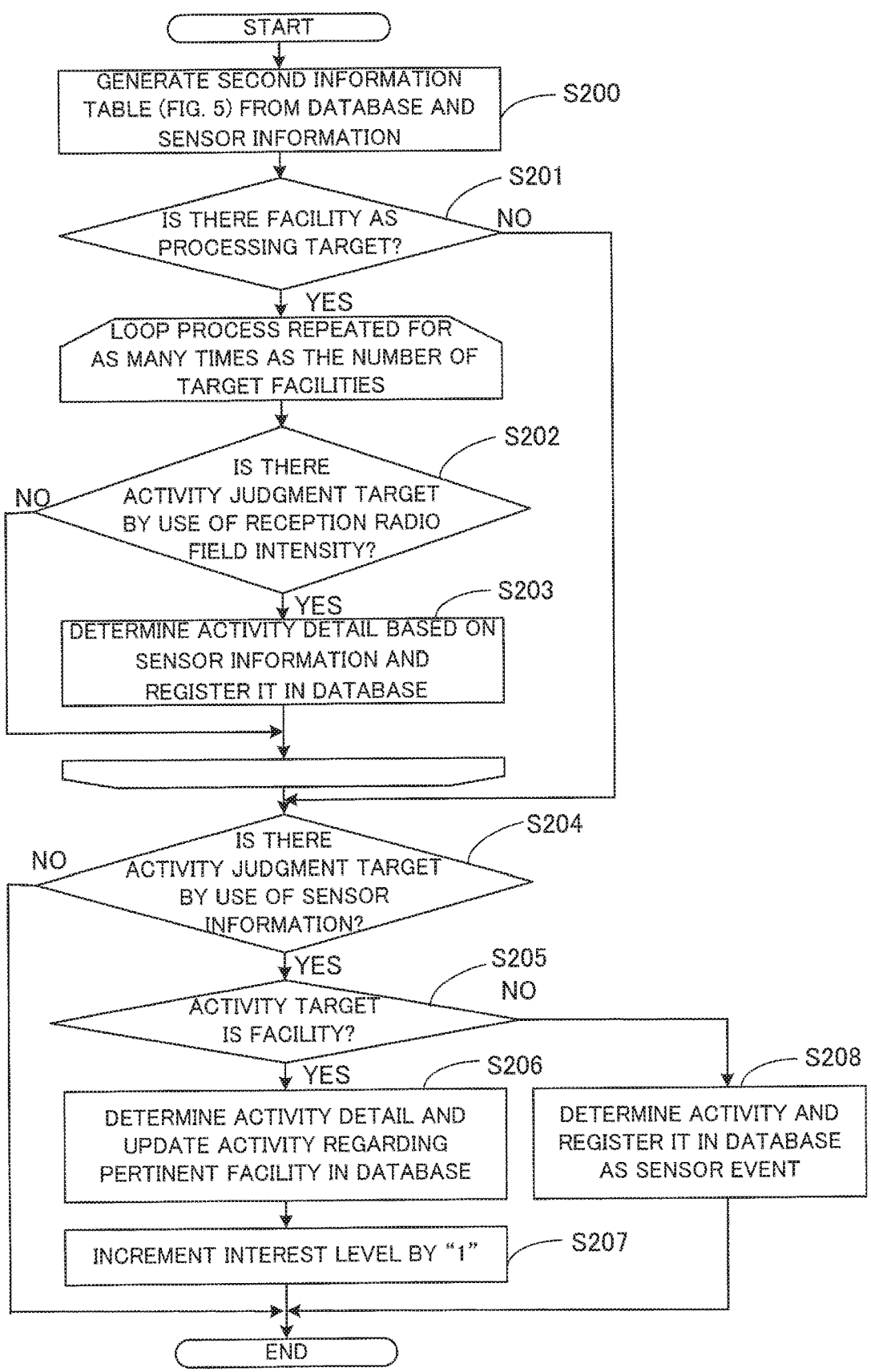
FIG. 6 is a flowchart showing an update process for the second information table stored in the database in the mobile information terminal of the information providing system according to the first embodiment.

FIG. 6 is a flowchart showing an update process of the second information table stored in the database 14a in the mobile information terminal 10 of the information providing system 1 according to the first embodiment. The activity judgment unit 12 starts the process in response to a command from the control unit 16 and thereafter the process of FIG. 6 is repeated at regular time intervals.

The activity judgment unit 12 generates the second information table from the "moving speed" and the "moving direction" as the detection result acquired from the sensor unit 11 and the "time", the "facility ID" and the "reception radio field intensity (present)" acquired from the first information table IT01 as information regarding the facility from which the beacon is currently received (step S200).

Subsequently, the activity judgment unit 12 judges whether or not there exists a facility as a processing target (target facility) based on the generated second information table, and executes a loop process of steps S202 and S203 when an activity judgment regarding the target facility is made (YES in step S201), or executes the process from step S204 otherwise (NO in the step S201).

When making the activity judgment regarding the target facility (YES in the step S201), the activity judgment unit 12 makes the activity judgment by use of the reception radio field intensity. If there exists an activity judgment target (YES in the step S202), the activity judgment unit 12 executes the process of the step S203 and the following steps; if there exists no activity judgment target (NO in the step S202), the activity judgment unit 12 ends the activity judgment regarding the facility (step S202). Whether or not there exists an activity judgment target by use of the reception radio field intensity is judged based on history records of the reception radio field intensity of the target facility in the second information table. For example, the target facility is regarded as the activity judgment target at a time at which the reception radio field intensity decreases after gradual increase.

The activity judgment unit 12 determines the activity detail based on the change in the sensor information around the time when the reception radio field intensity of the facility as the activity judgment target by use of the reception radio field intensity reaches the maximum, and updates the first information table IT01 by using the determined activity detail and the time (step S203). In the case of the second information table AT01, for example, in regard to the facility ID "0056", the reception radio field intensity reaches the maximum at the time T5 and decreases at the time T6, and thus the facility becomes the activity judgment target by use of the reception radio field intensity at the time T6. Then, since the sensor information remains unchanged from the time T3 to the time T6, that is, the "moving speed" is "low speed" and the "moving direction" is "north", the activity judgment unit 12 determines the activity detail as "low speed passage", updates the "time" of the facility ID "0056" in the first information table IT01 to the time T5, and registers the "low speed passage" as the "activity information".

In the case of the second information table AT02, in regard to the facility ID "0057", the reception radio field intensity reaches the maximum at the time T9 and decreases at the time T10, and thus the facility becomes the activity judgment target by use of the reception radio field intensity at the time T10. Then, the "moving speed" as sensor information changed like "low speed", "stop" and "low speed" from the time T7 to the time T10, the "moving direction" changed like "north", "east" and "north", and the facility having the facility ID "0057" is a dining shop, and thus the activity detail is determined as "entry", the "time" of the facility ID "0057" in the first information table IT01 is updated to the time T9, and the "entry" is registered in the "activity information".

When the activity judgment in regard to the facilities has been performed the number of times corresponding to the number of facilities, or when there is no processing target facility, the activity judgment unit 12 makes an activity judgment by use of the sensor information. If there exists an activity judgment target, the activity judgment unit 12 performs the process of step S205 and the following steps; if there exists no activity judgment target, the activity judgment unit 12 ends the process (step S204). Whether or not there exists an activity judgment target by use of the sensor information is judged based on the "moving speed" or the "moving direction" in the second information table. For example, the facility is judged to be the activity judgment target at a time when "stop" continues for a certain time.

When the activity judgment unit 12 makes the activity judgment, if judging the target of the activity to be a facility based on whether or not facility information is included in the second information table and the "activity information" regarding the facility in the first information table IT01, the activity judgment unit 12 executes the process of step S206 and the following steps; if judging the target of the activity not to be a facility, the activity judgment unit 12 executes the process of step S208 and the following steps (step S205).

When the activity target is a facility (YES in the step S205), the activity judgment unit 12 determines and updates the activity detail based on the information in the second information table and the "activity information" regarding the pertinent facility in the first information table IT01 (step S206). Then, the activity judgment unit 12 adds 1 to the value of the "interest level" regarding the pertinent facility (step S207).

In the case of the second information table AT02, for example, the "moving speed" is "stop" from the time T11 to the time T12, and thus the facility becomes an activity judgment target by use of the sensor information at the time T12. Further, the "moving speed" is "stop" at the time T9, thereafter is "low speed" at the time T10, and is "stop" from the time T11 to the time T12, and the "moving direction" is "east" at the time T9, "north" at the time T10, and "west" from the time T11 to the time T12. Furthermore, the target facility is the facility having the facility ID "0057" and the activity regarding the facility in the first information table IT01 is "entry". From these items of information, the user is judged to have stopped at the entrance of a shop and thereafter entered the shop and taken a seat, and the activity detail is determined as "entry". The determination of the activity detail may be made either based on the activity of "seating" obtained from the sensor unit 11 or on condition that the reception radio field intensity of the beacon transmitted from the beacon transmitter installed in the shop exceeds a threshold value, for example.

When the activity target is not a facility (NO in the step S205), the activity judgment unit 12 determines the activity detail based on the sensor information in the second information table and newly registers the activity detail in the first information table IT01 as a sensor event (step S208).

FIG. 7 is a diagram showing an example of the first information table (in a case where a sensor event is added) stored in the database 14*a* in the mobile information terminal 10 of the information providing system 1 according to the first embodiment. The first information table IT02 in FIG. 7 indicates activity in a case where the user walking on a floor at a quick pace lost his/her route and stopped at a crossroads, for example. FIG. 8 is a diagram showing an example of the second information table (in a case where a sensor event is added) stored in the database 14*a* in the mobile information terminal 10 of the information providing system 1 according to the first embodiment. FIG. 8 shows a second information table AT03 corresponding to the case of FIG. 7.

In the case of the second information table AT03 shown in FIG. 8, the "moving speed" is "stop" from the time T127 to the time T128, and thus the facility becomes an activity judgment target by use of the sensor information at the time T128. Then, only the facility ID "0026" represents a facility valid at the time T128 in the second information table AT03 and the "activity information" regarding the facility ID "0026" in the first information table IT02 is "high speed passage", and thus the activity target is judged not to be a facility and the sensor event registration process is executed.

The activity judgment unit 12 judges from the second information table AT03 that the user's "moving speed" is "high speed" from the time T121 to the time T126 and "stop" from the time T127 to the time T128 and the user's "moving direction" is "south" from the time T121 to the time T126, "east" at the time T127", and "multiple" (indicating changes into multiple "moving directions") at the time T128", determines the activity detail as "course pondering", and registers "T128" as the "time", "−1" as the "facility ID" and "course pondering" as the "activity information" in the first information table IT02.

As above, not only activity related to a facility but also characteristic activity obtained from the sensor unit 11 is stored as a history record in the first information table stored in the database 14a.

Figure 9:
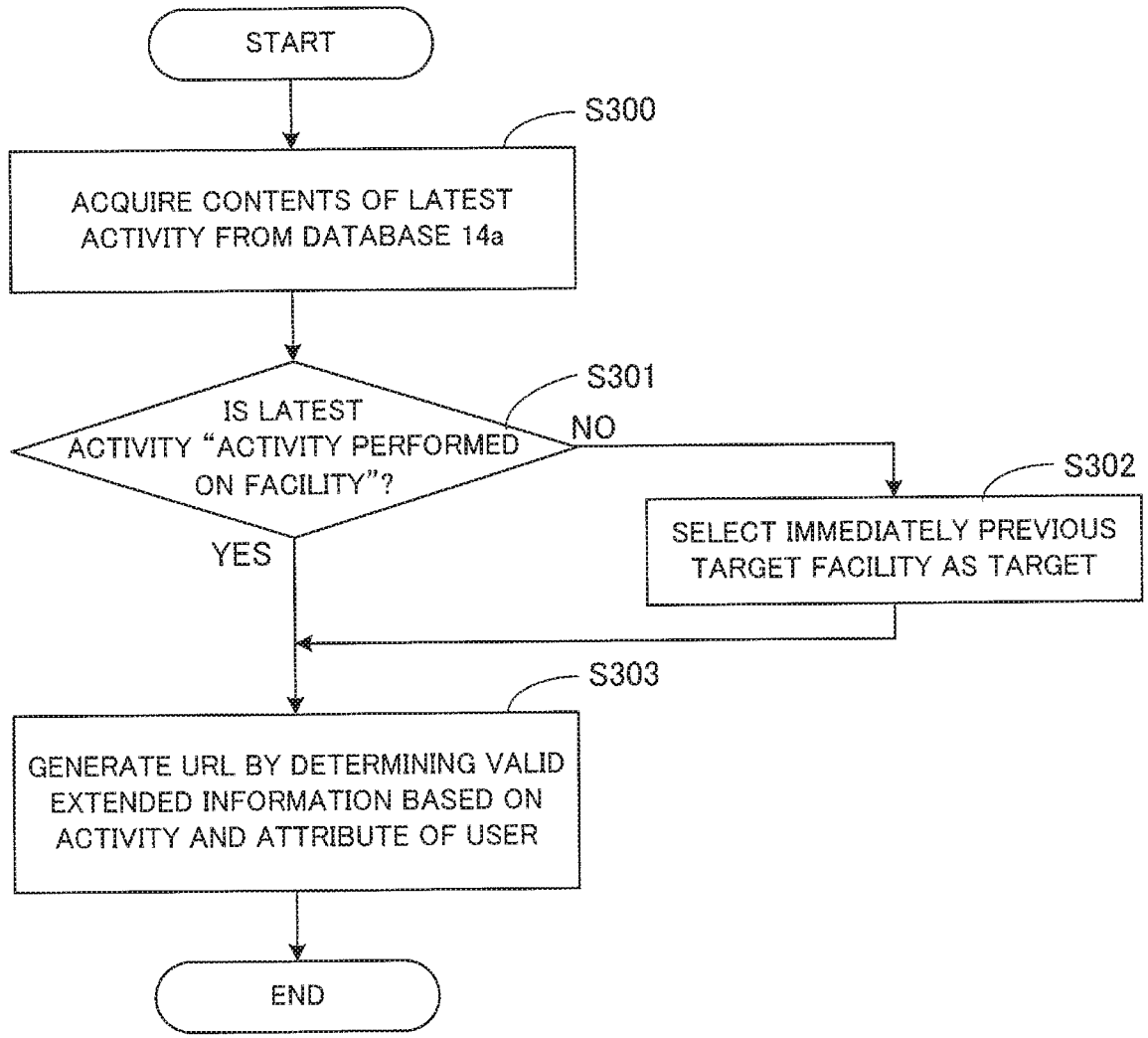
FIG. 9 is a flowchart showing a URL generation process of a URL generation unit in the mobile information terminal of the information providing system according to the first embodiment.

FIG. 9 is a flowchart showing a URL generation process of the URL generation unit 13 in the mobile information terminal 10 of the information providing system 1 according to the first embodiment.

The URL generation unit 13 starts the URL generation process in response to a command from the control unit 16. First, the URL generation unit 13 acquires the contents of the latest "activity information" from the first information table IT01 stored in the database 14a (step S300).

For example, at the time T9 in the second information table AT02 (FIG. 5) stored in the database 14a, the latest "activity information" corresponds to "entry" into the facility having the facility ID "0057" in the first information table IT01 (FIG. 3) and the activity is "activity related to a facility", that is, "activity of which purpose is a facility".

The latest "activity information" in the first information table IT02 (FIG. 7) at the time T128 in the second information table AT03 (FIG. 8) is "course pondering" as a sensor event and that does not represent "activity related to a facility".

Although not described in the second information table AT01 or AT02 (FIG. 5), the latest "activity information" at the time "13:52:10" in the first information table IT01 (FIG. 3) is "use" regarding the facility having the facility ID "0008" and that represents "activity related to a facility".

If the content of the latest "activity information" represents "activity related to a facility" (YES in step S301), the URL generation unit 13 executes the process of step S303 and the following steps; if not, the URL generation unit 13 executes the process of step S302 and the following steps (NO in the step S301).

If the content of the latest "activity information" does not represent "activity related to a facility" (NO in the step S301), the URL generation unit 13 executes the process of the step S303 and the following steps by setting the immediately previous facility in the first information table as the target (step S302).

For example, at the time T128 in the second information table AT03 (FIG. 8), the latest "activity information" is "course pondering" as a sensor event, and thus the URL generation unit 13 selects the facility having the facility ID "0024" or "0026" as the target from the first information table IT02 (FIG. 7).

Subsequently, based on the "activity information" in the first information table and the user's attributes previously set to the mobile information terminal 10, the URL generation unit 13 determines extended information to be used, and generates the URL of the access destination from the "basic URL", the "facility information" and the "extended information" regarding the facility as the target (step S303). In this case, the URL generation unit 13 selects an identifier based on an attribute included in the extended information and generates the URL of the access destination based on the selected identifier.

FIGS. 10(a) to 10(d) are diagrams showing configuration examples of the URL generated by the mobile information terminal 10 of the information providing system 1 according to the first embodiment.

In FIG. 10(a), U000 indicates a basic configuration of the URL generated by the URL generation unit 13. The basic configuration U000 includes a basic URL, facility information, activity information and attribute information. The basic URL and the facility information in U000 are set to be the same as the "basic URL" and the "facility information" in the first information table (FIG. 3, FIG. 7), and the "activity information" and the "attribute information" in U000 are set to be the same as the activity information in the first information table (FIG. 3, FIG. 7) and the attributes previously stored in the database 14a.

In FIG. 10(b), U001 indicates a configuration of a URL of content for providing a relevant shop or an affiliation coupon based on history records of entries. Differently from the basic configuration U000, in the configuration U001, "entry history information" is determined by judging from the interest level in the first information table (FIG. 3, FIG. 7), and the "attribute information" is selected from the attributes in the extended information in the first information table (FIG. 3, FIG. 7). For example, in the first information table IT01 (FIG. 3), the contents of the "activity information" at the time T9 in the second information table AT02 (FIG. 5) is "entry" into the curry restaurant having the facility ID "0057" and the "extended information" regarding the facility ID "0057" is "L G T C". Here, in regard to the coupon having the identifier "C" in the extended information, the "interest level" in the first information table IT01 (FIG. 3) is "2", and thus the coupon is selected based on a judgment that there is a past history record of entry. Then, the URL "URL0057.0057.JP.MA.131627.CPN" of the access destination is determined (generated) by combination with JP having the identifier "L" in the extended information, MA having the identifier "G" in the extended information, and "131627" having the identifier "T" in the extended information. As above, the URL generation unit 13 selects the identifier "C" based on activity included in the extended information by use of the activity information included in the first information table and the user's interest level in the aforementioned target facility, and generates the URL based on the selected identifier.

The mobile information terminal 10 is capable of accessing the URL of the access destination and thereby having the display unit 17 display, for example, an image based on Japanese-language content (the extended information "L" is JP) of a lunch coupon (the extended information "C" is CPN) for males (the extended information "G" is MA) from the curry restaurant having the facility ID "0057" stored in the content server 31.

In FIG. 10(c), U002 indicates a configuration of a URL of content provided based on a moving route history. In U002, extended information in the "activity information" is selected by judging from history records of the moving route in contrast with the basic configuration U000. For example, the activity detail at the time "13:52:10" in the first information table IT01 shown in FIG. 3 is "use" of the upward/downward escalator having the facility ID "0008" and the "extended information" regarding the facility ID "0008" in the first information table IT01 is "L" and "R". Here, the moving route "R" is set at "0057" since the activity target facility in the first information table IT01 immediately before the facility ID "0008" is the curry restaurant having the facility ID "0057". Then, since the other extended information "L" is JP, a URL "URL0008.0008.JP.0057" of the access destination is determined. By accessing the URL of the access destination, Japanese-language content in the content server 31 regarding a shop in the vicinity of the position where the user used the upward escalator having the facility ID "0008" can be displayed on the display unit 17, for example. As above, use of the moving route information makes it possible to determine the "moving direction" and it is possible not only to judge whether the user goes up or down on an escalator but also to provide content corresponding to a route the user follows on a normal floor.

Further, FIG. 10(d) shows U003 that indicates a configuration of a URL of content provided based on sensor history. In U003, in contrast to the basic configuration U000, extended information related to the "activity information" is selected for judgment from history records of sensor events. For example, the activity detail at the time T128 in the second information table AT03 shown in FIG. 8 is "course pondering" around the place here the user passed by the shoe shop of the facility ID "0026" via the pharmacy of the facility ID "0024", and the "extended information" regarding the facility ID "0026" in the first information table IT02 is "L", "G", "C" and "M". Here, the map "M" is selected since displaying a map of a vicinal area is considered to be effective based on the activity "course pondering" as a sensor event. Further, the coupon "C" is not selected since the activity is not activity performed on a shop (facility "activity information"). Then, a URL "URL0026.JP.MA.C.MAP" of the access destination is determined by combination with the other extended information "L=JP" and "G=MA". Here, in regard to the coupon not selected, "C" as the extended information is added without change. Access to the URL of the access destination makes it possible to display, on the display unit 17, Japanese-language content of a guide map around the facility of the facility ID "0026" in the content server 31, for example.

(1-3) Effect

As described above, in the mobile information terminal 10, the information acquisition method of the mobile information terminal 10, and the information providing system 1 according to the first embodiment, the URL of the access destination is generated by combining the basic URL and the facility information included in the beacon transmitted from the beacon transmitter 121, 122, 123 installed in each of the plurality of facilities, the user's activity history (the entry history such as a coupon, the moving route history such as a moving direction, the sensor history such as a vicinal area map), and the user's attributes (language, gender, time, etc.) that have been set to the mobile information terminal 10. Therefore, it is possible to quickly provide with content for an individual suitable for the user's present location or the user's activity purpose without search operation or the like.

Although the first embodiment has described the case where a unique basic URL is assigned to each facility (e.g., shop), a basic URL may be shared among a plurality of sections or among a plurality of floors in a facility, or a basic URL exclusive to classification 1 or classification 2 may be used. In such cases, the mobile information terminal 10 can display content produced by combining partial content based on the basic URL regarding sharing regions and partial content based on the facility information.

(2) Second Embodiment (2-1) Configuration

In the first embodiment, the description is given of an information providing system in which the user carrying the mobile information terminal moves by walking and the mobile information terminal receives the beacon transmitted from the beacon transmitter installed in a facility. However, there are cases where the user carrying the mobile information terminal moves by use of a transportation facility such as a train, a vehicle or a marine vessel. Therefore, in a second embodiment, a description will be given of an information providing system 2 in which information included in a beacon transmitted from a beacon transmitter installed in a transportation facility is varied according to traveling condition of the transportation facility and the mobile information terminal carried by the user displays content of operation guide corresponding to the traveling condition of the transportation facility. Except these features, the second embodiment is the same as the first embodiment.

Figure 11:
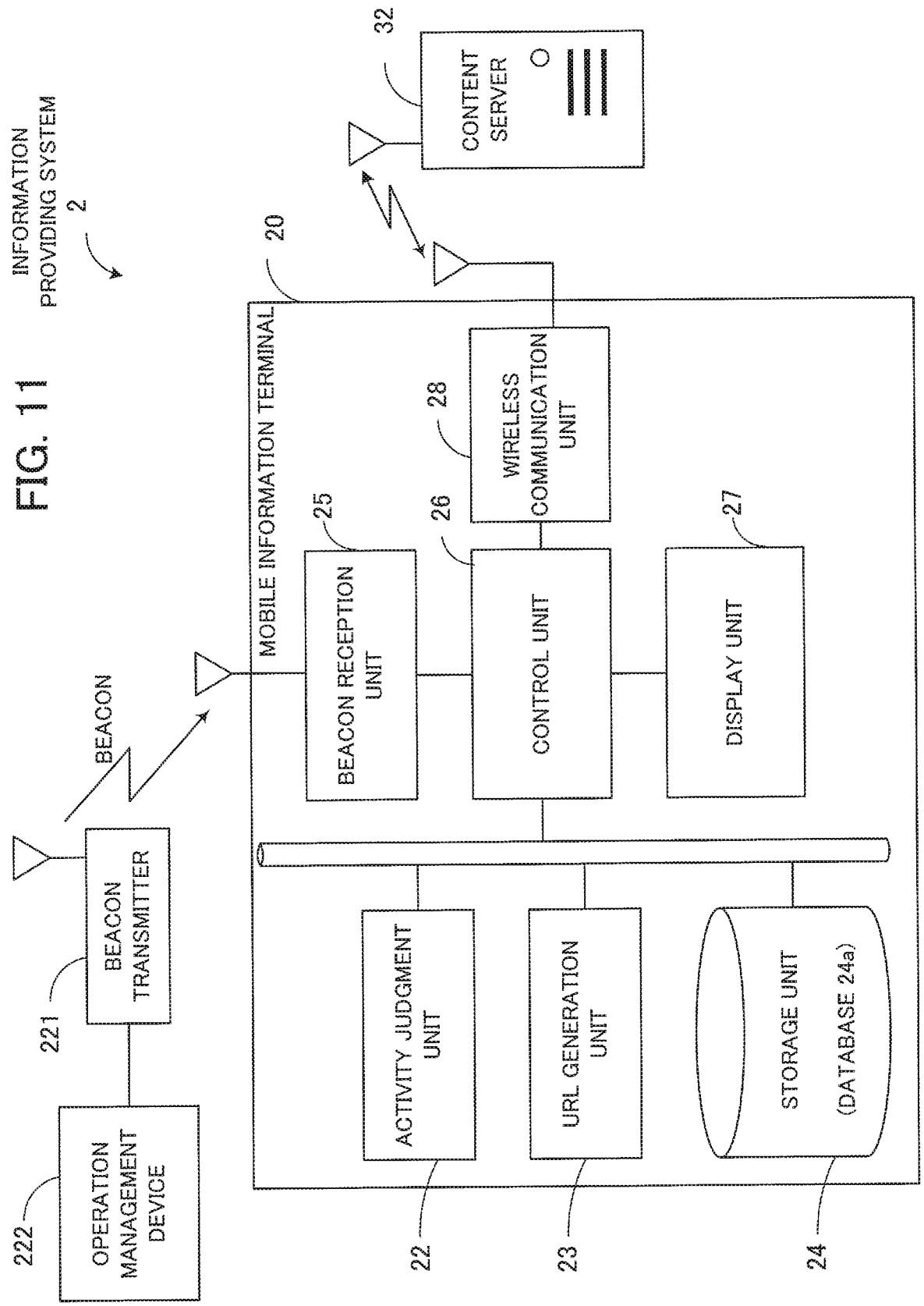
FIG. 11 is a functional block diagram schematically showing a configuration of an information providing system according to a second embodiment of the present invention.

FIG. 11 is a functional block diagram schematically showing a configuration of the information providing system 2 according to the second embodiment of the present invention. As shown in FIG. 11, the information providing system 2 is applicable to a facility such as a transportation facility. The information providing system 2 includes a mobile information terminal 20 such as a smartphone carried and used by a user, a content server 32 communicating with the mobile information terminal 20 via a network, and one or more beacon transmitters 221 transmitting beacons. The mobile information terminal 20 is a device capable of executing an information acquisition method according to the second embodiment.

The mobile information terminal 20 includes an activity judgment unit 22 for judging activity of the user, a URL generation unit 23 as an access destination information generation unit that generates a URL as the access destination information, and a storage unit 24 such as a semiconductor memory storing a database 24a. Further, the mobile information terminal 20 includes a beacon reception unit 25 for receiving the beacons transmitted from the beacon transmitter 221 repeatedly at time intervals (generally, periodically at predetermined time intervals) by means of short-range wireless communication, a control unit 26 controlling the operation of the whole of the mobile information terminal 20, a display unit 27 for displaying images, and a wireless communication unit 28 wirelessly communicating with the content server 32 via the network. The display unit 27 may be a touch panel. Content is displayed on the display unit 27 according to the traveling condition of the transportation facility. The mobile information terminal 20 has a function of generating information on the access destination in the content server 32 from information based on the beacons received by the beacon reception unit 25 and the activity detail based on the judgment by the activity judgment unit 22, acquiring content of the access destination indicated by the access destination information from the content server 32, and displaying the content on the display unit 27. The mobile information terminal 20 may include the sensor unit 11 in the first embodiment.

The content server 32 manages and stores a plurality of items of content corresponding to various traveling conditions of the transportation facility by using URLs different from each other.

The beacon transmitter 221 is capable of communicating with an operation management device 222 via a network, for example. The operation management device 222 is a management device installed in the transportation facility and capable of acquiring traveling information on the transportation facility. The operation management device 222 provides the beacon transmitter 221 with information to be included in the beacon. The beacon transmitter 221 transmits the beacon, according to facility information including transportation facility information provided from the operation management device 222 and the traveling condition of the transportation facility, at regular intervals, for example. The information included in the beacon transmitted from the beacon transmitter 221 is information that is changed with the passage of time, for example.

Figure 12:
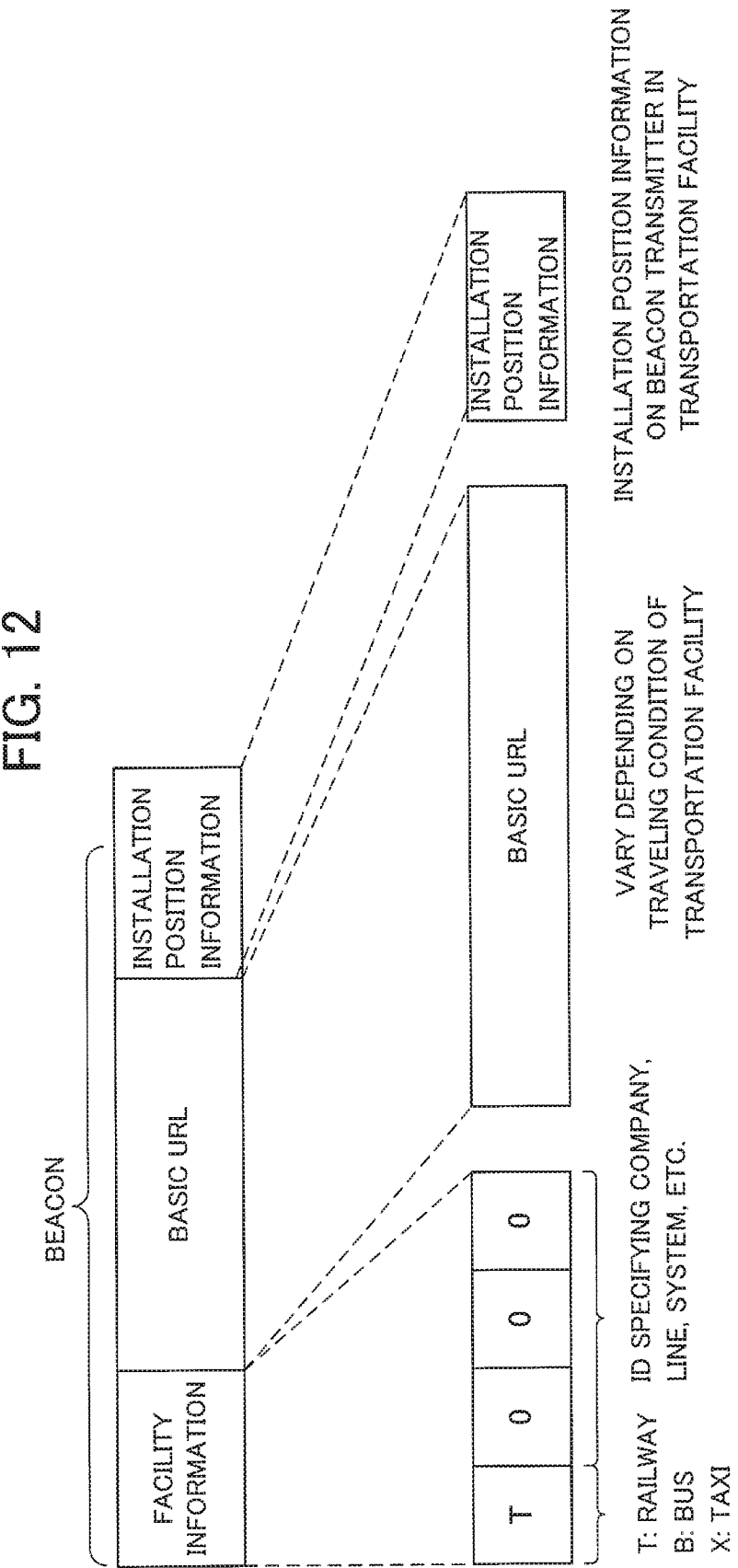
FIG. 12 is a diagram showing a configuration example of information included in a beacon in the information providing system according to the second embodiment.

FIG. 12 is a diagram showing a configuration example of the beacon in the information providing system 2 according to the second embodiment. As shown in FIG. 12, the beacon includes facility information, a basic URL and installation position information.

The facility information in the received beacon is formed of, for example, a character string of four characters similarly to that in the first embodiment. To the first character of the character string, a character like "T", "B" or "X" representing a transportation facility is assigned, for example. The characters "T", "B" and "X" represent "railway", "bus" and "taxi", respectively. To the second to fourth characters of the character string, IDs specifying a company, a line, a system, etc. in regard to the transportation facility assigned to the first character of the character string are assigned, for example.

The basic URL in the received beacon includes basic URL information for specifying content in the content server 32 to be provided according to the traveling condition of the transportation facility. In the case of a railway, the basic URL includes information as a combination of train type information such as "local", "express" or "limited express", information indicating the next stop, information indicating whether the train is stopped or traveling, information indicating the traveling condition in the vicinity of a station or the like, for example. Among these items of information, the next stop, the traveling condition or the like are information varying with time.

To the installation position information in the received beacon, position information on the installation of the beacon transmitter is assigned. In the case of a train on a railway, the installation position information is information indicating the car number of a car of the train and an installation position in the car, for example. By making the information transmitted from the beacon transmitter vary depending on the installation position, the contents of the content provided to the mobile information terminal 20 receiving the beacon can be changed depending on the position of the mobile information terminal 20. Accordingly, it is possible to provide the mobile information terminal 20 with content useful to the user.

In the mobile information terminal 20, the activity judgment unit 22 judges the present activity of the user based on the facility information acquired from the beacon reception unit 25 and stores activity information on the user based on the result of the judgment in the database 24a. The URL generation unit 23 generates the URL of the content on the basis of the facility information stored in the database 24a, the activity information on the user, and the attribute information regarding the previously set attributes of the user. While the first information table indicating the information based on the beacon and the information based on the activity of the user are stored in the database 24a, attribute information indicating an attribute such as the language used by the user and the gender of the user may also be stored.

FIG. 13 is a diagram showing an example of the first information table stored in the database 24a in the mobile information terminal 20 of the information providing system 2 according to the second embodiment. The first information table IT11 includes "time", "facility information", "basic URL", "installation position information", "reception radio field intensity" and "activity information". The "time" indicates the time when the user carrying the mobile information terminal 20 performs activity. The "time" is the time based on a time measurement means included in the mobile information terminal 20. The "facility information" is information on the facility as the target of the activity and is information included in the beacon. Each of the "basic URL" and the "installation position information" is information included in the beacon. The "activity information" is information on the activity performed on the facility as the target.

For example, FIG. 13 indicates activity of being currently on board a local train after changing from an express train.

The event represented by "ACT101" indicates that the user carrying the mobile information terminal 20 gets off a train on a certain line of a railway company defined by "057" at the time "15:23:31", the basic URL received most recently is "A-Train.Express.station20.stateA", and the reception radio field intensity at that time is "−91 dBm". Further, as to the position where the user boards the train, the "installation position information" is "4". For example, in a case where each car of the train is equipped with two beacon transmitters each installed at the head part and the tail part of the car and beacon transmitters are sequentially numbered from "1" from the first car of the train, the position represented by "4" is in the vicinity of the tail part of the second car.

The event represented by "ACT102" indicates that the user carrying the mobile information terminal 20 gets on a train on a certain line of the railway company defined by "057" at the time "15:26:35", the basic URL currently received is "A-Train.Local.station21.stateB", and the latest reception radio field intensity is "−62 dBm". Further, the "installation position information" is "9", and it indicates that the boarding position is in the vicinity of the head part of the fifth car.

The beacon reception unit 25 of the mobile information terminal 20 receives the beacon transmitted from the beacon transmitter and thereby updates the first information table IT11. The wireless communication unit 28 is a communication unit for accessing the URL in the content server 32 generated by the URL generation unit 23, and the display unit 27 displays the content of the URL generated by the URL generation unit 23. The control unit 26 performs control on each block.

(2-2) Operation

Figure 14:
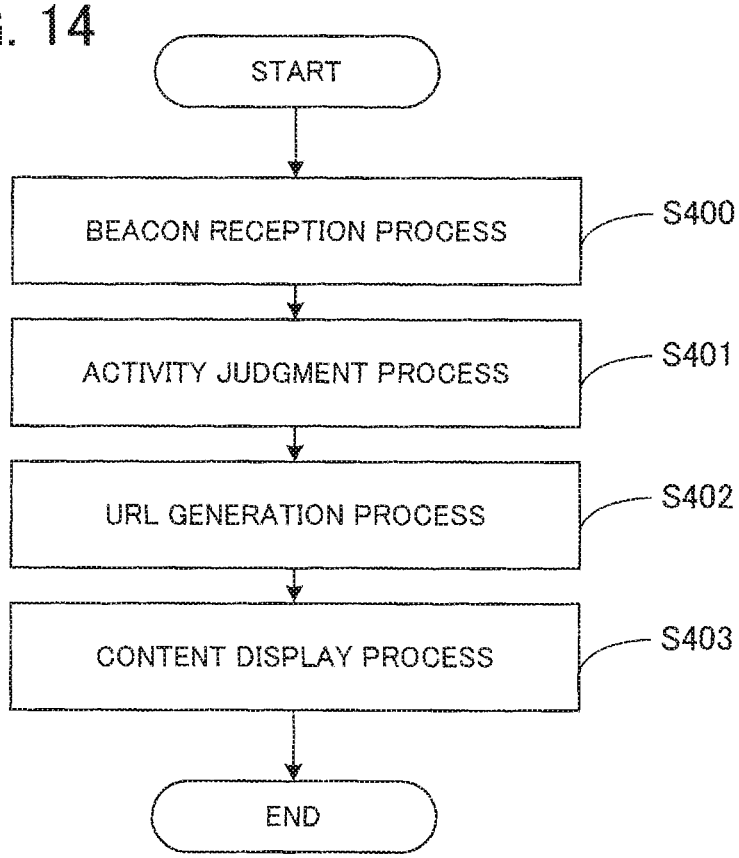
FIG. 14 is a flowchart showing a process of the mobile information terminal in the information providing system according to the second embodiment.

FIG. 14 is a flowchart showing the operation of the mobile information terminal 20 of the information providing system 2 according to the second embodiment. The control unit 26 of the mobile information terminal 20 starts executing the information acquisition method of the mobile information terminal 20 according to the second embodiment in response to a user operation.

First, the control unit 26 commands the beacon reception unit 25 to execute a beacon reception process (step S400). The beacon reception unit 25 receives the beacon transmitted from the beacon transmitter 221 and writes the "facility information", the "basic URL" and the "installation position information" as information included in the beacon and the "reception radio field intensity" (dBm) of the beacon to the first information table IT11 (FIG. 13). In this case, when the same "facility information" or the same "installation position information" has already been stored in the first information table IT11 (FIG. 13), the "basic URL" and the "reception radio field intensity" are updated.

Subsequently, the control unit 26 commands the activity judgment unit 22 to execute an activity judgment process (step S401). The activity judgment unit 22 makes a judgment on whether the user gets on or off a transportation facility based on the "facility information" and the "reception radio field intensity" in the first information table IT11, and updates the "activity information" in the first information table IT11 based on the result of the judgment. As shown in FIG. 12, the first character of the character string of the "facility information" indicates the type of the transportation facility, and when the "reception radio field intensity" is higher than or equal to a boarding threshold value, it is judged that the user carrying the mobile information terminal 20 boards the train, the "activity information" in the first information table IT11 is set at "on board", and the "time" is registered. When the reception radio field intensity is lower than or equal to a getting-off threshold value and no update is made for a certain period, it is judged that the user got off the train, the "activity information" is set at "get off", and the "time" is updated.

Subsequently, the control unit 26 commands the URL generation unit 23 to execute a URL generation process (step S402). The URL generation unit 23 generates the URL of the access destination from the "basic URL" and the "installation position information" regarding the activity "on board" in the first information table IT11 and the attributes stored in the database 24*a*.

Figure 15:
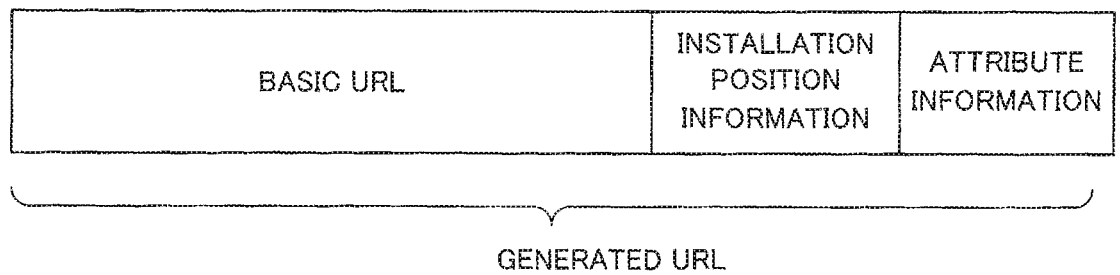
FIG. 15 is a diagram showing a configuration example of a URL generated by a URL generation unit of the mobile information terminal of the information providing system according to the second embodiment.

FIG. 15 is a diagram showing an example of the URL generated by the URL generation unit 23 of the mobile information terminal 20 of the information providing system 2 according to the second embodiment. As shown in FIG. 15, the URL generated by the URL generation unit 23 includes a "basic URL", "installation position information" and "attribute information". The "basic URL" and the "installation position information" are acquired from the first information table IT11. As the "attribute information", information stored in the database 24*a* can be used. For example, the language information or the gender information in the "extended information" in the first embodiment may be used as the "attribute information".

Therefore, when the "basic URL" is "A-Train.Express.station20.stateA", the "installation position information" is "4", and the "attribute information" is "US" indicating that the language is English, the URL of the access destination in regard to "ACT101" in the first information table IT11 is determined as "A-Train.Express.station20. stateA.4.US" as a combination of these items of information.

When the "basic URL" is "A-Train.Local.station21. stateB", the "installation position information" is "9", and the "attribute information" is "US" indicating that the language is English, the URL of the access destination in regard to "ACT102" in the first information table IT11 is determined as "A-Train.Local.station21.stateB.9.US" as a combination of these items of information.

Subsequently, the control unit 26 accesses the URL generated by the URL generation unit 23 by controlling the wireless communication unit 28, thereby acquires content stored in the content server 32, and displays an image based on the content on the display unit 27 (step S403).

(2-3) Effect

As described above, content useful to the user such as train operation guide can be provided quickly not via a search operation or the like by generating the URL of the access destination from the basic URL transmitted from the beacon transmitter 221 installed in the transportation facility such as a train and updated according to the traveling condition, the installation position information in the beacon, and the attribute information stored in the mobile information terminal 20.

Incidentally, while a case where the provided content is operation guide in regard to a transportation facility has been described as an example in the second embodiment, it is also possible to provide the mobile information terminal 20 with operation guide for an individual or advertisement content for an individual by changing the basic URL in conjunction with operation guide or advertisement content displayed on a guide display device installed in a train and generating the URL according to attributes that have been set to the mobile information terminal 20.

Modification

In the first and second embodiments described above, system integration is possible by switching content servers to be accessed based on the facility information included in the received beacon or storing both pieces of content in a common content server, and content for an individual suitable for the user's moving condition can be provided quickly not via a search operation or the like while the user moves from a commercial facility or a railway station shopping complex to a destination by using a transportation facility.

Figure 16:
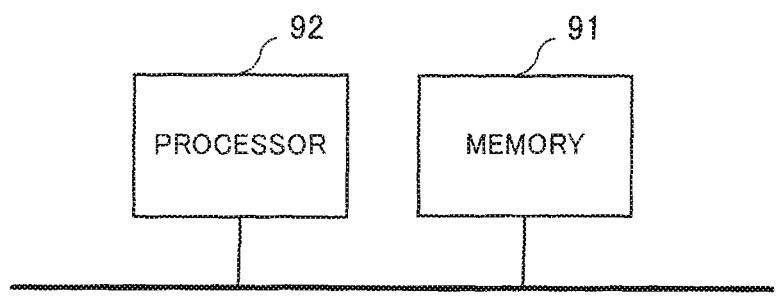
FIG. 16 is a hardware configuration diagram schematically showing a configuration of the mobile information terminals according to the first and second embodiments.

FIG. 16 is a hardware configuration diagram showing a configuration of a modification of the mobile information terminals 10 and 20 according to the first and second embodiments described above. The mobile information terminals 10 and 20 shown in FIG. 1 and FIG. 11 can be implemented by using a memory 91 as a storage device storing a program as software and a processor 92 as an information processing unit executing the program stored in the memory 91 (e.g., by a computer). In this case, the storage units 14 and 24 in FIG. 1 and FIG. 11 correspond to the memory 91 in FIG. 16, and the control units 16 and 26, the activity judgment units 12 and 22 and the URL generation units 13 and 23 in FIG. 1 and FIG. 11 correspond to the processor 92 executing the program. Incidentally, it is also possible to implement part of the control unit 16, 26, the activity judgment unit 12, 22 and the URL generation unit 13, 23 shown in FIG. 1 or FIG. 11 by the memory 91 shown in FIG. 16 and the processor 92 executing a program.

DESCRIPTION OF REFERENCE CHARACTERS

1, 2: information providing system, 10, 20: mobile information terminal, 11: sensor unit, 12, 22: activity judgment unit, 13, 23: URL generation unit (access destination information generation unit), 14, 24: storage unit, 14a, 24a: database, 15, 25: beacon reception unit, 16, 26: control unit, 17, 27: display unit, 18, 28: wireless communication unit, 31, 32: content server, 121, 122, 123, 221: beacon transmitter, 222: operation management device (management device).

What is claimed is:

1. A mobile information terminal comprising:
reception circuitry configured to receive a signal transmitted from a transmitter installed in a facility;
wireless communication circuitry configured to communicate with a content server via a network;
a memory to store a database;
activity judgment circuitry configured to generate information based on activity of a user from information based on the signal received by the reception circuitry and to store a first information table including information based on the signal and information based on the activity in the database;
access destination information generation circuitry configured to generate access destination information indicating an access destination in the content server from the first information table; and
control circuitry configured to acquire content from the access destination indicated by the access destination information via the wireless communication circuitry, wherein
the signal includes facility information regarding a target facility as the facility in which the transmitter is installed, basic information regarding the target facility, and extended information,
the first information table includes the facility information, the basic information and the extended information as the information based on the signal, and
the access destination information generation circuitry is further configured to generate the access destination information by combining the basic information, the facility information, an identifier based on activity included in the extended information, and an identifier based on an attribute included in the extended information.

2. The mobile information terminal according to claim 1, wherein the first information table further includes a time of registration or update of the information based on the signal, a present value and a maximum value of reception radio field intensity of the signal, activity information on the user regarding the target facility, and an interest level of the user regarding the target facility.

3. The mobile information terminal according to claim 2, wherein the access destination information generation circuitry is further configured to select an identifier based on activity included in the extended information by using the activity information and the interest level of the user regarding the target facility included in the first information table and generates the access destination information based on the selected identifier.

4. The mobile information terminal according to claim 3, wherein the extended information includes one or more items of information selected from:
language information specifying a language of the content,
gender information specifying a gender highly relevant to the content,
time information specifying a time regarding the content,
moving route information for specifying a moving route to the target facility in regard to the content,
map information for specifying a vicinal area map of the target facility in regard to the content, and
coupon information for specifying a coupon usable in the target facility in regard to the content.

5. The mobile information terminal according to claim 2, wherein the access destination information generation circuitry is further configured to select an identifier based on an attribute included in the extended information and generates the access destination information based on the selected identifier.

6. The mobile information terminal according to claim 1, further comprising a sensor to detect movement of the user, thereby outputting detection information based on the movement, wherein
the database stores a second information table including the detection information and information indicating reception radio field intensity of the signal, and
the activity judgment circuitry is further configured to update the first information table based on the second information table.

7. The mobile information terminal according to claim 1, further comprising a display to display an image,
wherein the control circuitry is further configured to make the display an image based on the acquired content.

8. An information acquisition device comprising:
activity judgment circuitry configured to generate information based on activity of a user from information based on a signal transmitted from a transmitter installed in a facility and to store a first information table including information based on the signal and information based on the activity in a database, the signal including facility information regarding a target facility as the facility in which the transmitter is installed, basic information regarding the target facility, and extended information;
access destination information generation circuitry configured to generate access destination information indicating an access destination in the content server from the first information table; and
control circuitry configured to acquire content from the access destination indicated by the access destination information via the wireless communication circuitry,
wherein the access destination information generation circuitry is further configured to generate the access destination information by combining the basic information, the facility information, an identifier based on activity included in the extended information, and an identifier based on an attribute included in the extended information.

9. The information acquisition device according to claim 8, wherein the first information table further includes a time of registration or update of the information based on the signal, a present value and a maximum value of reception radio field intensity of the signal, activity information on the user regarding the target facility, and an interest level of the user regarding the target facility.

10. The information acquisition device according to claim 9, wherein the access destination information generation circuitry is further configured to select an identifier based on activity included in the extended information by using the activity information and the interest level of the user regarding the target facility included in the first information table and generates the access destination information based on the selected identifier.

11. The information acquisition device according to claim 10, wherein the extended information includes one or more items of information selected from:

language information specifying a language of the content,
gender information specifying a gender highly relevant to the content,
time information specifying a time regarding the content,
moving route information for specifying a moving route to the target facility in regard to the content,
map information for specifying a vicinal area map of the target facility in regard to the content, and
coupon information for specifying a coupon usable in the target facility in regard to the content.

12. The information acquisition device according to claim 9, wherein the access destination information generation circuitry is further configured to select an identifier based on an attribute included in the extended information and generates the access destination information based on the selected identifier.

13. An information acquisition method comprising:
receiving a signal transmitted from a transmitter installed in a facility, the signal including facility information regarding a target facility as the facility in which the transmitter is installed, basic information regarding the target facility, and extended information;
generating information based on activity of a user from information based on the received signal and storing a first information table including information based on the signal and information based on the activity in a database;
generating access destination information indicating an access destination in a content server from the first information table;
acquiring content from the access destination indicated by the access destination information; and
generating the access destination information by combining the basic information, the facility information, an identifier based on activity included in the extended information, and an identifier based on an attribute included in the extended information.

14. An information providing system comprising:
a mobile information terminal; and
a content server to provide content,
wherein the mobile information terminal includes:
reception circuitry configured to receive a signal transmitted from a transmitter installed in a facility;
wireless communication circuitry configured to communicate with the content server via a network;
a memory to store a database;
activity judgment circuitry configured to generate information based on activity of a user from information based on the signal received by the reception circuitry and to store a first information table including information based on the signal and information based on the activity in the database;
access destination information generation circuitry configured to generate access destination information indicating an access destination in the content server from the first information table; and
control circuitry configured to acquire content from the access destination indicated by the access destination information via the wireless communication circuitry, wherein
the signal includes facility information regarding a target facility as the facility in which the transmitter is installed, basic information regarding the target facility, and extended information,
the first information table includes the facility information, the basic information and the extended information as the information based on the signal, and
the access destination information generation circuitry is further configured to generate the access destination information by combining the basic information, the facility information, an identifier based on activity included in the extended information, and an identifier based on an attribute included in the extended information.

15. The information providing system according to claim 14, further comprising:
the transmitter; and
management device to provide the transmitter with information to be included in the signal,
wherein information included in the signal transmitted from the transmitter is varied with passage of time.

* * * * *